United States Patent
Williams, Jr. et al.

(10) Patent No.: US 6,250,427 B1
(45) Date of Patent: Jun. 26, 2001

(54) DEER STAND WITH UNITARY WELDED CONSTRUCTION

(76) Inventors: Jerry Woodrow Williams, Jr.; Jerry Woodrow Williams, Sr., both of 2950 Erwin Bridge Rd., Conyers, GA (US) 30207

( * ) Notice: Subject to any disclaimer, the term of this patent is extended or adjusted under 35 U.S.C. 154(b) by 0 days.

(21) Appl. No.: 09/022,611

(22) Filed: Feb. 12, 1998

(51) Int. Cl.[7] .................................................. E04G 3/00
(52) U.S. Cl. ..................... 182/187; 182/134; 182/188; 108/108; 108/152
(58) Field of Search .................. 182/92, 133, 134, 182/135, 136, 187, 188; 248/231.21, 218.2; 108/108, 152

(56) References Cited

U.S. PATENT DOCUMENTS

| | | | |
|---|---|---|---|
| D. 330,430 | 10/1992 | Jurn et al. .............................. | 182/92 |
| 3,871,482 | * 3/1975 | Southard .............................. | 182/187 |
| 4,549,635 | 10/1985 | Early ..................................... | 182/187 |
| 4,708,221 | 11/1987 | Kubiak .................................. | 182/187 |
| 4,782,918 | 11/1988 | Brunner et al. ...................... | 182/187 |
| 4,787,476 | * 11/1988 | Lee ................................... | 182/187 X |
| 4,909,353 | 3/1990 | Govin et al. ......................... | 182/187 |
| 4,924,972 | 5/1990 | Westbrock .......................... | 182/187 |
| 4,936,416 | 6/1990 | Garon ................................... | 182/187 |
| 4,995,475 | 2/1991 | Berkbuegler ........................ | 182/187 |
| 5,009,285 | 4/1991 | Ramsey ................................ | 182/187 |
| 5,060,756 | * 10/1991 | D'Acquisto ......................... | 182/187 |
| 5,078,232 | 1/1992 | Hancosky ............................. | 182/187 |
| 5,103,935 | 4/1992 | Amacker ............................... | 182/187 |
| 5,105,910 | 4/1992 | Engstrom .............................. | 182/187 |
| 5,143,177 | 9/1992 | Smith ................................... | 182/187 |
| 5,199,527 | 4/1993 | Jennings .............................. | 182/187 |
| 5,205,375 | 4/1993 | Shriver ................................. | 182/187 |
| 5,226,505 | 7/1993 | Woller et al. ........................ | 182/187 |
| 5,316,105 | 5/1994 | Reggin et al. ....................... | 182/187 |
| 5,355,974 | 10/1994 | Miller ................................... | 182/187 |
| 5,363,941 | 11/1994 | Richard ............................... | 182/187 |
| 5,409,083 | 4/1995 | Thompson et al. .................. | 182/187 |
| 5,413,192 | 5/1995 | Woller et al. ........................ | 182/187 |
| 5,462,135 | 10/1995 | Ambler et al. ....................... | 182/187 |
| 5,469,934 | 11/1995 | Pherigo ................................ | 182/187 |
| 5,628,383 | * 5/1997 | McIntyre .............................. | 182/187 |
| 5,819,874 | * 10/1998 | Kuhnert ............................... | 182/187 |

FOREIGN PATENT DOCUMENTS 1037931    8/1958    (DK).

* cited by examiner

Primary Examiner—Daniel P. Stodola
Assistant Examiner—Bruce A. Lev
(74) Attorney, Agent, or Firm—Womble Carlyle Sandridge & Rice, PLLC

(57) ABSTRACT

A deer stand includes a foot platform, a seat platform, and stanchions which join the foot platform to the seat platform. The foot platform, the seat platform and the stanchions are preferably formed primarily from welded metal tubes to provide the deer stand with a rugged, durable unitary welded construction. To fasten the deer stand to a tree, the seat platform has an eye bolt and a J bolt attached to opposite sides of the seat platform. A chain is attached to the eye bolt. Two pairs of spikes extend from the seat and foot platforms, respectively, for engagement with a tree. The deer stand is attached to a tree by tilting the deer stand so that the spikes of the seat platform engage with the tree at an angle with respect to the tree. The chain is then wrapped about the trunk of the tree and linked to the J bolt so that the chain encircles and is as taut as possible about the tree. The deer stand is then lowered from its tilted position so that the ends of the spikes of the seat platform move toward a perpendicular attitude with respect to the tree and engage with the tree to drive the seat platform away from the tree, thus further tightening the chain. When fully lowered, the spikes of the foot platform engage with the tree to further secure the deer stand to the tree.

5 Claims, 2 Drawing Sheets

DEER STAND WITH UNITARY WELDED CONSTRUCTION

BACKGROUND OF THE INVENTION

1. Field of the Invention

This invention is directed to a deer stand which is sturdy and durable due to the use of elongated members, preferably made of lengths of metal tubes, joined by welding to form a unitary contruct including foot and seat platforms held together by stanchions. The deer stand can be fastened to a tree with a chain, an eye bolt, a J bolt and spikes attached to the deer stand.

2. Description of the Related Art

Many types of deer stands are used for deer hunting. Deer stands can generally be classified as climbing types, ladder types, and seat- and seat-and-foot platform types fastenable to a tree. A climbing-type deer stand allows a hunter to attach the deer stand to a tree, and has movable parts which allow the hunter to climb to relatively great heights in the tree. The climbing-type deer stands have certain hunting advantages by enabling the hunter at a relatively great height in the tree to spot deer over comparatively greater distances, by keeping the hunter's human scent at a relatively high altitude at which deer are less likely to detect the scent, and, because deer instinctively do not expect danger from above the ground, by evading sight-detection of the hunter by deer. However, climbing deer stands are relatively dangerous. In fact, the most common and serious accidents to deer hunters involve incidents in which a hunter falls from a deer stand or the deer stand slips on the tree from a relatively great height. Thus, climbing deer stands pose a significant risk to the hunter, particularly when used high in a tree.

The ladder-type deer stands essentially include a ladder with a seat attached near or at the top of the ladder, on which a hunter sits. The hunter assembles and leans the ladder-type deer stand against a tree, and climbs the ladder to the seat. While most ladder stands are relatively stable and do not extend to relatively great heights in the tree so that the hunter is less subject to injury from falling from the deer stand, the ladder-type deer stand is generally produced in several parts which are relatively heavy, and thus very difficult to carry to a desired tree for assembly.

The seat- or seat-and-foot-platform-types of deer stands tend to be relatively portable and so are comparatively easy to carry to a desired hunting location to be fastened to a tree. However, currently-used seat- or seat-and-foot-platform-types of deer stands are generally made of flimsy construction which can expose a deer hunter to the danger of falling to the ground even when these types of deer stands are used at relatively low heights in a tree. Moreover, the construction of these types of deer stands tends to wear quickly and can easily be damaged, so that a hunter can be injured by falling from a tree due to the failure of a part of the deer stand which has been damaged or which has worn-out with use over time. Accordingly, it would be desirable to provide a deer stand of the seat-and-foot-platform type which is relatively portable, and yet which is sturdy and durable and relatively safe for the hunter to use.

SUMMARY OF THE INVENTION

This invention overcomes the disadvantages noted above. This invention includes a deer stand which is a unitary construct generally formed by welding together members preferably made from lengths of metal tubes. The deer stand generally includes a seat platform and a foot platform joined together with stanchions.

The foot platform includes a foot platform frame which has two parallel, opposing first and second side elongated members extending in a first direction, with respective first ends joined by welding to respective ends of a first end elongated member extending in a second direction perpendicular to the first direction. Extending at angles with respect to the first and second directions, opposing angled elongated members extend from and have first ends that are welded to respective second ends of the first and second side members. The respective second ends of the angled members are joined by welding to respective ends of a second end elongated member extending in the second direction, and thus, which is disposed in a parallel relationship with the first end member. The second end member has a length that is relatively short compared to the length of the first end member, so that the angled members extend in respective directions which converge from their first to their second ends.

The foot support platform also includes a series of parallel foot support elongated members extending in the second direction, which have respective ends joined by welding to respective inner sides of the first and second side members. Preferably, four parallel foot support members are welded to the first and second side elongated members. A stability elongated member extends along the first direction, and has a first end welded to the middle of the second end member on its inner side, and a second end welded to the middle of the nearest foot support member on a side thereof. The first and second side members, the first and second end members, the first and second angled members, the foot support members and the stability member are coplanar and comprise the foot platform.

The seat platform has a seat frame which is preferably square in shape. Of course, the seat frame can be made with other shapes such as, for example, a rectangular shape. The seat frame includes parallel, opposing first and second side elongated members extending along the first direction, and has parallel, opposing first and second end elongated members extending along the second direction. Respective ends of the first and second side members are welded to respective ends of the first and second end members to form the rectangular seat frame. The edge of a square piece of wire mesh is welded to top sides of the first and second side members and first and second end members to form the seat platform.

The seat platform is joined to the foot support platform with three stanchions. A first stanchion extends in a vertical, third direction normal to the first and second directions, and has a first end welded to a top side of the second end member of the foot platform at a middle portion thereof, and a second end welded to a middle portion of the second end member of the seat platform on the bottom side thereof. The seat platform also includes a second stanchion with a first end welded to the joint between welded ends of the first side member and the first end member of the seat platform, and with a second end welded to the joint between the welded ends of the first side member and the first angled member of the foot platform. From its first end to its second end, the second stanchion extends from the seat platform to the foot platform in a direction outwardly from respective geometric centers of the seat and foot platforms, and also in a direction toward the first end member of the foot platform. The seat platform also includes a third stanchion with a first end welded to the joint between welded ends of the second side member and the first end member of the seat platform, and with a second end welded to the joint between the welded ends of the second side member and the second angled member of the foot platform. From its first end to its second end, the third stanchion extends from the seat platform to the foot platform in a direction outwardly from respective geometric centers of the seat and foot platforms, and also in a direction toward the first end member of the foot platform. Accordingly, the second and third stanchions are angled so that they prevent the seat platform from rocking from side-to-side, or forward or backward, so that the seat platform is relatively stable.

To fasten the deer stand of this invention to a tree, the first side member of the seat platform has hole drilled therethrough in proximity to the second end member of the seat platform. The hole in the second side member of the seat platform receives the stem of an eye bolt. The eye bolt has a stem extending through the hole in the first side member of the seat platform, and is held to the first side member with a bolt or rivet disposed inside of the seat frame at the end of the eye bolt opposite its eye. The eye of the eye bolt thus extends outwardly from the first side of the seat frame of the seat platform. A link at the end of a chain is threaded onto the eye of the eye bolt. In the second side member of the seat platform in proximity to the second end member of the seat platform, a hole is drilled through the second side member which receives the stem of a J bolt. The J bolt is bolted with a nut or rivet attached to the end of the J bolt opposite its J part inside of the seat frame so that the J bolt is held to the seat platform. The J part of the J bolt thus extends outwardly from the second side member of the seat platform, and is disposed so that its open side faces toward the first end member of the seat platform. The second end member of the floor support has two spikes welded on opposite sides of the middle portion of the second end member of the foot platform on the outer side thereof. The spikes extend perpendicularly outward from the second end member along the first direction. The seat platform also has two spikes welded on opposite sides of the middle portion of the second end member of the seat platform on the outer side thereof. The spikes welded to the seat platform extend perpendicularly outward from the seat frame along the first direction.

To fasten the deer stand of this invention to a tree, the deer stand is lifted to a desired height on the trunk of a tree using a ladder, for example. The deer stand is tilted so that the seat platform is in close proximity to the tree and the first stanchion forms an angle of about 60 degrees relative to the tree trunk. In this position, the spikes attached to the seat platform are in engagement with the tree trunk and angled at about 150 degrees relative to the tree trunk. The chain is wrapped about the girth of the tree trunk, and a link of the chain is slipped over the end of the J bolt. The link should be selected so that the chain is as taught as possible when the link is slipped over the J bolt. With the chain encircling the tree, the deer stand is tilted downward so that the first end member of the foot platform is lower relative to its initial tilted position. When the deer stand is tilted downward, the ends of the spikes extending from the seat platform tilt toward a position perpendicular to the tree trunk, thus forcing the seat frame outward from the tree, and causing the chain to pull even more tightly around the tree. When the deer stand is fully tilted downward, the spikes of the foot platform also engage with the tree to provide additional security in fastening the deer stand to the tree.

Advantageously, the deer stand of this invention is rugged and durable primarily due to its unitary welded construction. Thus, the deer stand is not likely to be damaged and is comparatively less subject to wear with use over time. Moreover, the deer stand of this invention is relatively stable and accordingly is comparatively safe relative to other deer stands. In addition, the excellent stability of the deer stand of this invention provides a stable shooting platform. Also, for the durability and stability provided by the deer stand of this invention, the deer stand of this invention is relatively lightweight due to the preferred use of lengths of metal tubes to form the members of the deer stand. In addition, the deer stand of this invention can be securely fastened to a tree to afford the hunter increased safety relative to other deer stands.

These together with other objects and advantages, which will become subsequently apparent, reside in the details of construction and operation as more fully hereinafter described and claimed, reference being had to the accompanying drawings, forming a part hereof, wherein like numerals refer to like parts throughout.

DESCRIPTION OF THE PREFERRED EMBODIMENTS

Figure 1:
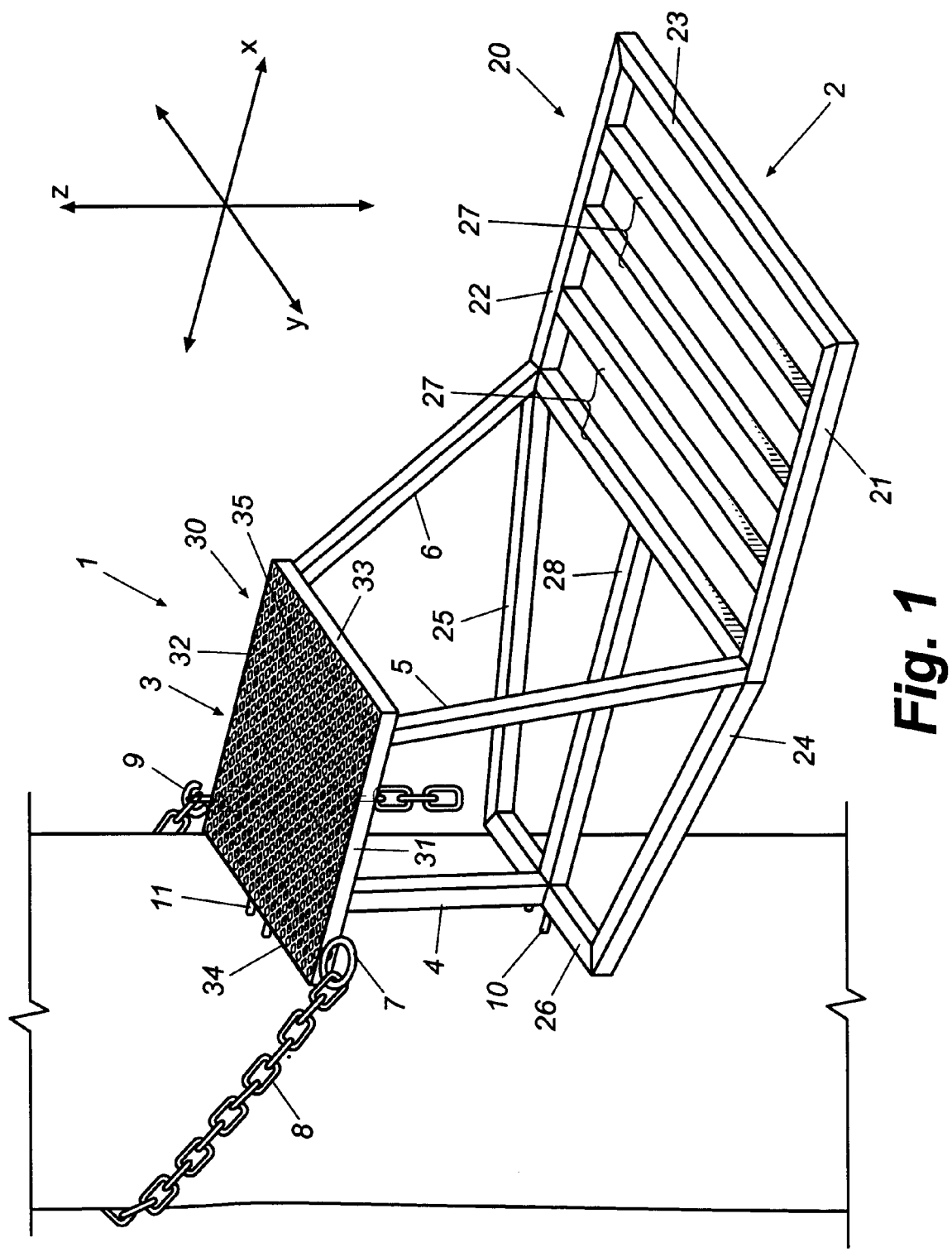
FIG. 1 is a perspective view of a deer stand in accordance with this invention.
Figure 2:
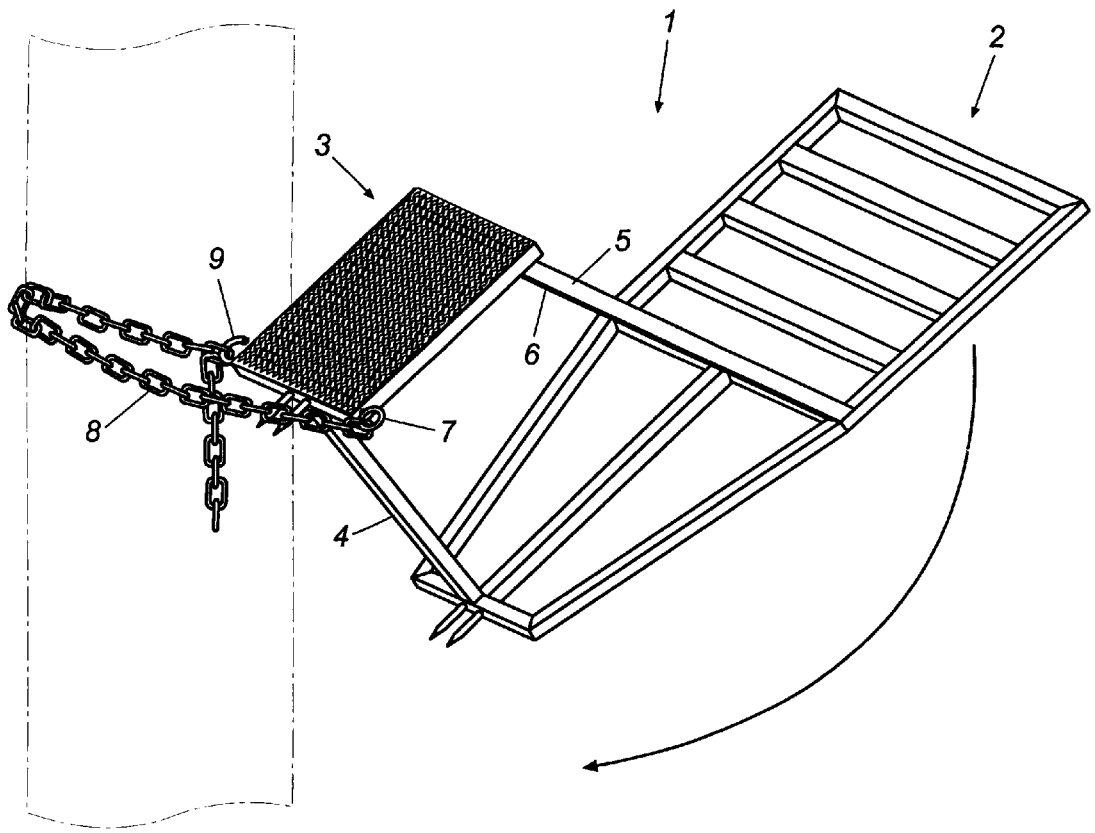
FIGS. 2 and 3 are side views of the deer stand of this invention, showing the operation of fastening the deer stand to a tree.
Figure 3:
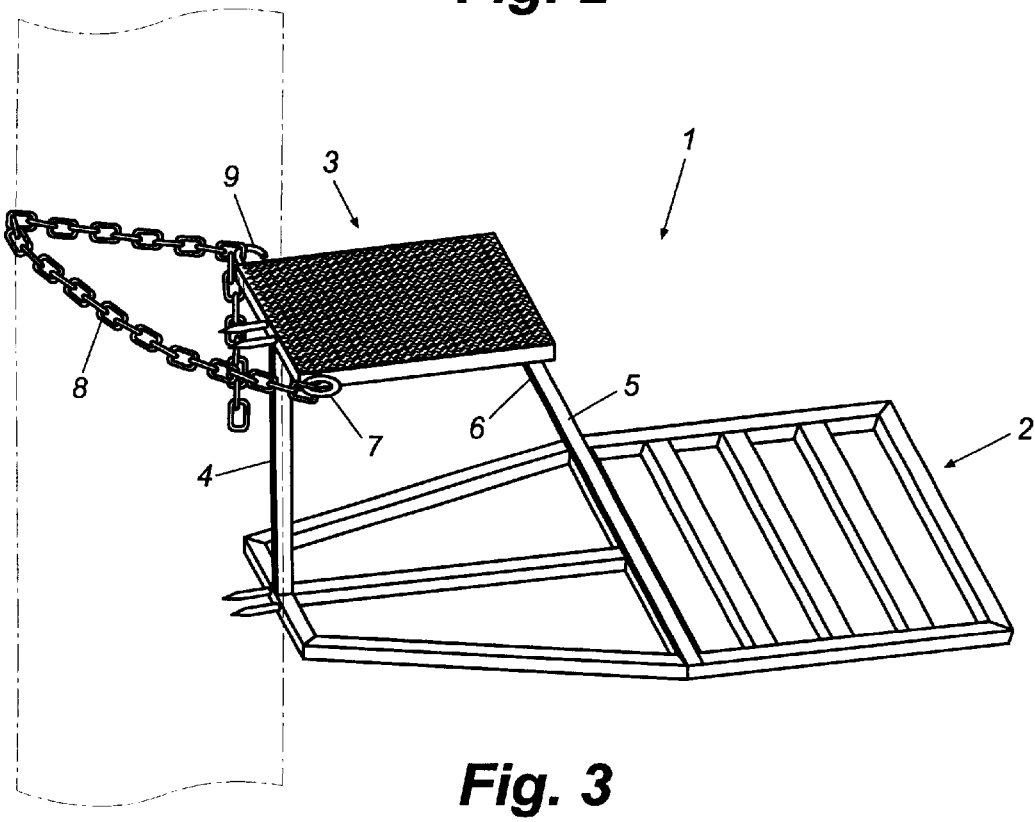

In FIG. 1, the deer stand 1 generally includes a foot platform 2, a seat platform 3 and stanchions 4, 5, 6. The foot platform 2 is disposed in a plane defined by the x- and y-axes of the orthogonal x-, y- and z-axes indicated in FIG. 1. The foot platform 2 includes a foot platform frame 20 with parallel, opposing first and second side elongated members 21, 22 which extend along the x-axis direction in FIG. 1. The foot platform frame 20 also includes a first end elongated member 23 extending along the y-axis direction and thus perpendicular to the first and second side members 21, 22. The first end member 23 has a first end welded to a first end of the first side member 21, and has a second end welded to a first end of the second side member 22. The foot platform frame 20 also includes first and second angled elongated members 24, 25 extending at angles with respect to the x- and y-axes directions. Respective first ends of the first and second angled members 24, 25 are welded to respective second ends of the first and second side members 21, 22. The foot platform frame 20 also includes a second end elongated member 26 which extends along the y-axis direction. The second end member 26 has a first end welded to the second end of the first angled member 24, and a second end welded to a second end of the second angled member 26.

The foot platform 2 also includes a plurality of elongated, parallel foot support members 27 extending along the y-axis direction, with respective ends welded at intervals to the sides of the first and second side members 21, 22 inside of the foot platform frame 20. The foot platform 2 also includes an elongated stability member 28 extending along the x-axis direction, which has a first end welded to the inner side of a middle portion of the second end member 26, and a second end welded on a side of a middle portion of the nearest foot support member 27.

The seat platform 3 of the deer stand 1 includes a seat frame 30 having first and second side elongated members 31, 32 and first and second end elongated members 33, 34. The first and second side members 31, 32 extend along the x-axis direction, and the first and second end members 33, 34 extend along the y-axis direction. A first end of the first side member 31 is welded to a first end of the first end member 33, and a second end of the first side member 31 is welded to a first end of the second end member 34. A first end of the second side member 32 is welded to a second end of the first end member 33, and a second end of the second side member 32 is welded to a second end of the second end member 34. The seat frame 30 is thus preferably square in shape, but can be rectangular or trapezoidal in shape, for example. A wire mesh 35 is cut to a size that conforms to the rectangular shape of the seat frame 30, and is welded to the top sides of the first and second side members 31, 32 and the first and second end members 33, 34.

To hold the seat platform 3 to the foot platform 2, the deer stand 1 includes three stanchions 4, 5, 6. The stanchion 4 is an elongated member extending in the z-axis direction in FIG. 1. The stanchion 4 has a first end welded to a bottom side at a middle portion of the second end member 34 of the seat platform 3, and has a second end welded to a top side at a middle portion of the second end member 26 of the foot platform 3. The stanchion 5 is an elongated member extending in a direction which is angled with respect to the x-, y- and z- axes. The stanchion 5 has a first end welded to the joint between the first end of the first side member 31 and the first end of the first end member 33 of the seat platform 3. The stanchion 5 has a second end opposite its first end, which is welded to the joint between the first side member 21 and the first angled member 24. Thus, from its first end to its second end, the stanchion 5 extends outwardly from the geometric centers of the seat platform 3 and the foot platform 2 in the y-axis direction, and also extends forward to a degree in the x-axis direction. The stanchion 6 is disposed symetrically relative to the stanchion 5, and is an elongated member extending in a direction which is angled with respect to the x-, y- and z-axis directions. The stanchion 6 has a first end welded to the joint between the second side member 32 and the first end member 33 of the seat platform 3, and has a second end opposite its first end, welded to the joint between the second side member 22 and the second angled member 25 of the foot platform 2. From its first end to its second end, the stanchion 6 extends in a direction outwardly from the geometric centers of the seat platform 3 and the foot platform 2, along the negative y-axis direction. The stanchion 6 also extends long the x-axis direction from its first end to its second end. The stanchions 4, 5 and 6 thus provide significant stability for the seat platform 3 by preventing the seat platform 3 from rocking from side-to-side, or from tilting forward or backward. In addition, the stability provided by the stanchions 4, 5 and 6 makes the deer stand 1 effective and safe even for relatively heavy hunters.

Preferably, the first and second side members 21, 22, the first and second end members 23, 26, the first and second angled members 24, 25, the foot support members 27 and the stability member 28 of the foot platform 2 as well as the first and second side members 31, 32 and the first and second end members 33, 34 of the seat platform 3, and the stanchions 4, 5, 6, are made from lengths of metal tube. The desirability of using metal tube for the members of the foot platform 2, the seat platform 3 and the stanchions 4, 5, 6, is that metal tube provides significant structural strength and yet, because the metal tube is hollow, the metal tube is relatively lightweight for the strength it provides. One suitable type of metal tube is made of steel and is square in cross-section, with ¾ inch sides and a thickness of ⅛ inch, and comes in 20 foot lengths which can be cut to appropriate sizes to form the members of the foot platform 2, the seat platform 3 and the stanchions 4, 5, 6. This type of metal tube is commercially available from several sources including Industrial Metals™, Inc. of Atlanta, Ga. Of course, other types of metal tube can be used without departing from the scope of this invention. Preferably, the members of the foot platform 2, the members of the seat platform 3 and the stanchions 4, 5, 6, are welded together with a solid weld without seams.

To fasten the deer stand 1 to a tree, the deer stand 1 includes an eye bolt 7, a chain 8 and a J bolt 9. The first side member 31 of the seat from 30 has a hole drilled through its outer and inner sides in near proximity to the welded joint between the first side member 31 and the second end member 34 of the seat platform 30. The stem of the eye bolt 7 is inserted through the hole in the first side member 31 so that the eye portion of the eye bolt 7 is positioned outside of the seat frame 30, and the stem of the eye bolt 7 extends inside of the seat frame 30. A nut or rivet (not shown) is then attached to the end of the stem of the eye bolt 7 to secure it to the first side member 31 of the seat platform 3. Preferably, the eye bolt 7 is made from ⅜ or ¼ inch steel. The eye portion of the eye bolt 7 receives a link at the end of the chain 8. Preferably, the chain 8 is about 3 to 5 feet in length with steel links which are ⅜ or ¼ inch thick. A hole is drilled through the inner and outer sides of the second side member 32 of the seat platform 3 in near proximity to the welded joint between the second side member 32 and the second end member 34 of the seat platform 3. The hole in the second side member 32 receives the stem of the J bolt 9 so that the stem extends through the outer and inner sides of the second side member 332 with the end of the stem of the J bolt 9 positioned inside of the seat frame 30. A rivet or bolt (not shown) is attached to the end of the stem of the J bolt 9 to secure the J bolt 9 to the second side member 32. Preferably, the open end of the J portion of the J bolt 9 faces toward the first end member 31 of the J bolt 9.

The deer stand 1 also includes two pairs of spikes 10, 11 which are made of steel and are about 1½ inches in length. The spikes 10 are welded on opposite sides of the middle portion of the second end member 26 of the foot platform 2. The spikes 10 extend in the x-axis direction from the outer side of the second end member 26. The spikes 11, like the spikes 10, are also made of steel and in length are about 1½ inches. The spikes 11 are welded at their respective bases on opposite sides of the middle portion of the second end member 34 of the seat platform 3. The spikes 11 extend along the x-direction outwardly from the outer side of the second end member 34 of the seat platform 3.

In operation, the deer stand 1 is lifted to a desired height in a tree using a ladder, for example. The deer stand 1 is positioned so that the spikes 11 attached to the seat platform 3 rest in tilted attitude against the tree, and so that the deer stand 1 is tilted so that the stanchion 4 is at an angle of about 60 degrees with respect to the tree. In this tilted position, the chain 8 is wrapped about the girth of the tree, and a link of the chain 8 is selected and slipped over the open end of the J bolt 9 so that the chain 8 is as taut as possible. The first end member 23 of the foot platform 2 is then lowered so that the spikes 11 engage with the tree and move toward an attitude that is perpendicular to the tree trunk, thus forcing the chain 8 to become even more taut about the trunk of the tree. When the deer stand 1 is tilted to its fully lowered position, the spikes 10 engage with the side of the tree to further secure the deer stand 1 to the tree. To climb into the deer stand 1, a hunter can grip the first end member 23 of the foot platform 2 and pull himself onto the foot platform 2. The hunter can then sit on the seat platform 2 with his feet resting on the foot support members 27 of the foot platform 2.

Advantageously, the deer stand 1 of this invention provides several advantages relative to other deer stands. Because the deer stand 1 of this invention has a unitary welded construction preferably formed by welding metal tube members together, the deer stand 1 is durable and sturdy, and can effectively support a hunter's weight during use. The stability of the deer stand 1 can also be attributed to the design of the deer stand 1 in part due to the use of stanchions 5, 6 which extend from their first ends to their second ends both outward from and forward of the seat frame 30 so that the seat platform 3 is securely supported and will not tilt from side-to-side, or forward and backward. The stability of the deer stand 1 provides safety for the hunter during use because the hunter will not tend to fall out of the deer stand 1 due to shifting or tilting thereof as the hunter shifts his weight, and moreover, the deer stand 1 will not collapse or break to expose the hunter to the danger of falling from the deer stand. Also, the stability of the deer stand 1 provides a stable shooting platform so that a hunter can effectively aim a weapon from the deer stand 1. Despite its structural rigidity, the deer stand 1 can be transported relatively easily because the deer stand 1 is composed, in its preferred embodiment, of welded metal tubes which are hollow and therefore which weigh less than solid metal bars or the like. Also, the deer stand 1 can be readily fastened to a tree merely by lifting the deer stand 1 into the tree, positioning the deer stand 1 at a tilt with repect to the tree, wrapping a chain attached to the deer stand 1 about the trunk of the tree, linking the chain to a J bolt on the seat platform 3 of the deer stand 1, and tilting the deer stand 1 downward to secure the deer stand 1 to the tree. Moreover, the deer stand 1 requires little or no assembly by the hunter, and is relatively inexpensive for the advantages the deer stand 1 provides.

Although the invention has been described with specific illustrations and embodiments, it will be clear to those of ordinary skill in the art that various modifications may be made therein without departing from the spirit and scope of the invention as outlined in the following claims.

We claim:

1. A deer stand comprising:

a foot platform including
- a first elongated side member extending in a first direction;
- a second elongated side member extending in the first direction and opposing the first side member;
- a first elongated end member extending in a second direction perpendicular to the first direction, having a first end welded to a first end of the first elongated side member, and a second end welded to a first end of the second side member;
- a first elongated angled member extending in a direction angled with respect to the first and second directions, and having a first end welded to a second end of the first side member;
- a second elongated angled member extending in a direction angled with respect to the first and second directions, and having a first end welded to a second end of the second side member;
- a second elongated end member extending along the second direction and having a first end welded to a second end of the first angled member, and a second end welded to a second end of the second angled member, the second end member being shorter in length than the first end member;
- a plurality of parallel elongated foot support members extending along the second direction, and having opposing ends attached to inner sides of the first and second side members; and
- a stability member extending along the first direction, and having a first end welded to a middle portion of the second end member on an inner side thereof, and having a second end welded to an inner side of and at a middle portion of one of the plurality of foot support members closest to the stability member;

a seat platform including
- a first elongated side member extending in the first direction;
- a second elongated side member extending in the first direction and opposing the first side member of the seat portion;
- a first elongated end member extending along the second direction and having a first end welded to a first end of the first side member of the seat platform, and a second end welded to a first end of the second side member of the seat platform;
- a second end member extending along the second direction, having a first end welded to a second end of the first side member of the seat platform, and a second end welded to a second end of the second side member of the seat platform; and a wire mesh having an edge welded to top sides of the first and second side members of the seat platform and the first and second end members of the seat platform;

a first elongated stanchion extending in a third direction normal to the first and second directions, having a first end welded to a middle portion of a bottom side of the second end member of the seat platform, and a second end welded to a middle portion on a top side of the second end member of the foot platform;

a second elongated stanchion having a first end welded at a joint between the first end of the first side member of the seat platform, and having a second end welded to a joint between the second end of the first side member of the foot platform and the first end of the first angled member, the second stanchion extending from its first end to its second end in a direction outwardly from the first side member of the seat platform and forwardly of the first end member of the seat platform; and a third elongated stanchion having a first end welded to a joint of the second end of the first end member of the seat platform and the first end of the second side member of the seat platform, and having a second end welded to a joint between the second end of the second side member of the foot platform and the first end of the second angled member, the third stanchion extending from its first end to its second end in a direction outwardly from the second side member of the seat platform and forwardly of the first end member of the seat platform; said first, second, and third elongated stanchions being the only stanchions in said deer stand.

2. The deer stand as claimed in claim 1, further comprising:

an eye bolt attached to the first side member of the seat platform;

a chain having an end attached to the eye bolt; and a J bolt attached to the second side member of the seat platform.

3. The deer stand as claimed in claim 2, wherein the eye bolt is attached to the first side member of the seat platform in a near proximity to the second end member of the seat platform, and wherein the J bolt is attached to the second side member of the seat platform in near proximity to the second end member of the seat platform.

4. The deer stand as claimed in claim 3, further comprising:

a first pair of spikes extending along the first direction and welded on opposite sides of the middle portion of the second end member of the foot platform on an outer side thereof; and a second pair of spikes extending along the first direction and welded on opposite sides of the middle portion of the second end member of the seat platform on an outer side thereof.

5. The deer stand as claimed in claim 1, wherein the first and second side members of the foot platform, the first and second end members of the foot platform, the first and second angled members, the foot support members, the stability member, the first and second side members of the seat platform, the first and second end members of the seat platform and the first, second and third stanchions, are made from lengths of metal tube.

* * * * *